June 16, 1925.
R. W. MARTIN
NUT LOCK
Filed Dec. 22, 1922
1,542,073
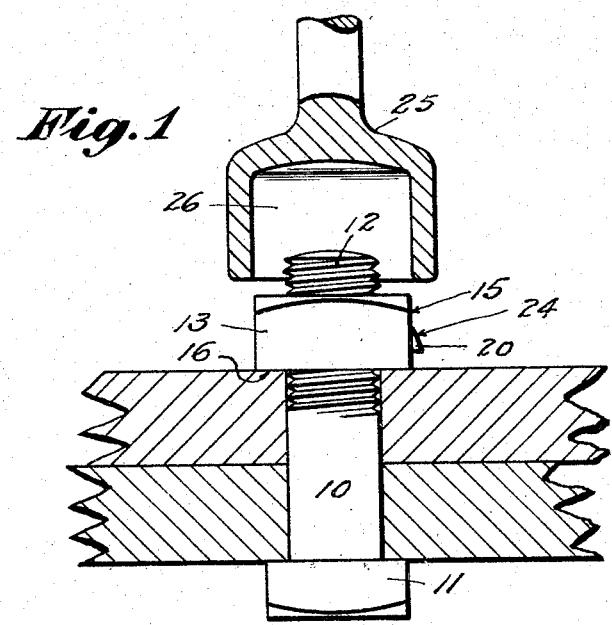
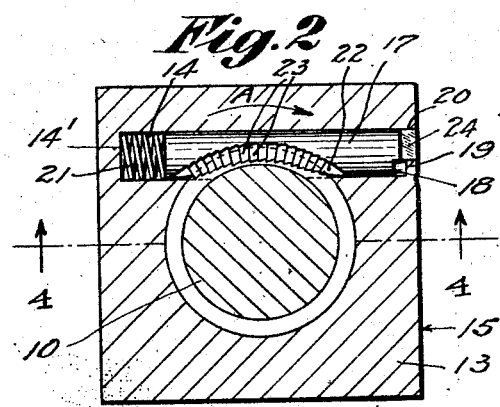
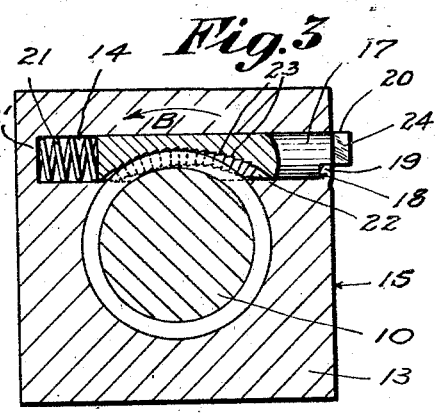
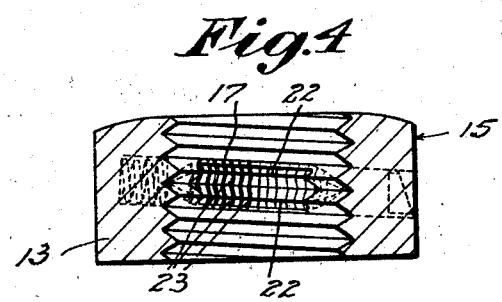
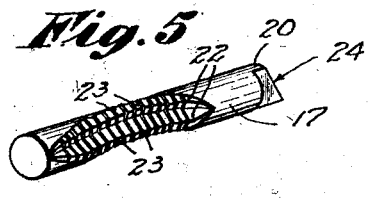
INVENTOR
Robert W. Martin
BY
Pierre Barnes
ATTORNEY Patented June 16, 1925.

1,542,073

UNITED STATES PATENT OFFICE.

ROBERT W. MARTIN, OF GLENOMA, WASHINGTON, ASSIGNOR TO R. W. MARTIN COMPANY, OF TENINO, WASHINGTON, A CORPORATION OF WASHINGTON.

NUT LOCK.

Application filed December 22, 1922. Serial No. 608,412.

*To all whom it may concern:*

Be it known that I, ROBERT W. MARTIN, a citizen of the United States, residing at Glenoma, in the county of Lewis and State of Washington, have invented certain new and useful Improvements in Nut Locks, of which the following is a specification.

This invention relates to nut-locks, and its object is to produce a device of this character which will be of simple and inexpensive construction and which will be efficient in operation.

A further object of the invention is the provision of a nut containing a locking pin which is effective to automatically engage the associated bolt in a manner to permit the nut being rotated to advance the same upon the bolt and prevent any accidental retractive movement thereof or its becoming loose by vibration of the work to which the invention is employed.

Other specific objects and advantages of the invention will be set forth in the following specification.

The invention consists in the novel construction, adaptation and combination of parts hereinafter described and claimed.

In the accompanying drawing,—

Figure 1 is an elevational view of a bolt and a nut which embodies my invention shown applied to work which is shown in vertical section, and a portion of a socket wrench shown partly in section.

Figs. 2 and 3 are horizontal sections taken through the nut and bolt shown in Fig. 1, in Fig. 2 the locking pin is illustrated in its inoperative position with respect to the bolt. Fig. 4 is a vertical section through 4—4 of Fig. 2 with the bolt omitted. Fig. 5 is a perspective view of the locking pin shown in the preceding views.

In said drawing, the reference numeral 10 designates a bolt having a head 11 at one end and provided at its other end with a screw threaded portion 12 engaging a nut 13, all of which may be of any suitable forms and sizes.

The nut 13 is provided with a transversely arranged cylindrical chamber 14 which extends from one of the peripheral surfaces, as 15, of the nut and arranged to have its axis tangent, or nearly so, to the threaded bore of the nut.

The chamber 14, moreover, is desirably inclined, as indicated by dotted lines in Fig. 4, with respect to the plane of the end or bearing surface 16 of the nut.

Provided in said chamber is a locking pin 17 having adjacent to one of its ends a shoulder 18 which is engageable against a stop 19 provided on the nut at the outer end of the chamber.

Said pin is provided with a reduced end portion 20 adapted to be protruded from the chamber 14 by means of a spring 21 which is interposed between the other end of the pin and the end wall $14^1$ of said chamber.

The pin 17 is provided intermediate its length with an arcuate recess of a radius greater than the radius of the bolt 5, said recess is formed with ridges 22 (Fig. 5) disposed approximately longitudinally of the pin and spaced apart to interfit with the threads of the bolt longitudinally of the latter. The ridges are disposed somewhat helically with respect to the axis of the nut and constitute, in effect, portions of the screw threads of the nut when the pin is in the inoperative position in which it is shown in Fig. 2.

Furthermore, said ridges are serrated to afford teeth 23 directed toward the inner end of the pin as shown. The outer end of said pin is formed with an extremity 24 which is beveled as shown in Figs. 1 and 5.

The spring 21 and pin 17 are inserted within the chamber and prevented from removal by swaging a portion of the nut body to produce the stop 19 at the mouth of said chamber.

The nut 13 is engaged with the screw threads of the bolt 10 by rotating either the nut or the bolt. When the pin 17 is held by the spring 21 in its outermost position (Fig. 3) the nut can only be turned to screw the same down upon the bolt, but cannot be retracted, in the rotary direction indicated by the arrow B, by reason of the ridges 22 being brought out of register with the bolt threads and the teeth 23 biting, so to speak, into the bolt. To retract the nut from the bolt, by rotating the former in the direction of arrow A in Fig. 2, the pin must be shifted into its Fig. 2 position so that the ridges 22 and the teeth 23 thereof will be clear of or out of engagement with the bolt threads. Any wrench may be employed to rotate the nut, but the same may be most expeditiously done by the use of a wrench 25 having a socket 26 of substantially the same shape and dimensions in transverse section as the nut, so that in applying the wrench one of the peripheral walls of the socket thereof will act against the sloping extremity 24 of the pin to force the pin into its neutral or Fig. 2 position.

A nut provided with a locking pin constructed and arranged to operate according to the present invention is free to be rotated to advance the nut toward the work; but can only be rotated for retracting when the pin is forced into the nut.

What I claim, is,—

A nut having a chamber extending thereinto from one of its peripheral faces and arranged to have the longitudinal axis of the chamber inclined with respect to the plane of the end bearing surface of the nut and substantially tangent with the internal threaded surface of the nut, said chamber having at its outer end a restricted opening to afford a stop thereat, a pin in said chamber, said pin having intermediate its length an arcuate recess, said pin being provided longitudinally thereof with a ridge which extends into said recess, said pin having an end of reduced diameter which extends from a shoulder on the pin through said restricted opening, said shoulder cooperating with said stop to limit the outward movement of the pin with respect to the chamber, and a spring provided in said chamber and acting against the pin to protrude the end of the latter from said chamber.

Signed at Pe Ell, Washington, this 9th day of December 1922.

ROBERT W. MARTIN.

Witnesses:
J. A. PEARSALL,
E. H. LESTER.